Figure 1:
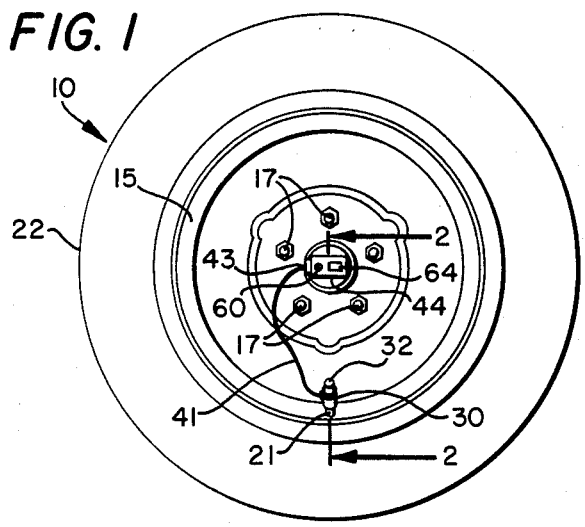

United States Patent [19]

Crutcher

[11] Patent Number: 4,581,925

[45] Date of Patent: Apr. 15, 1986

[54] WHEEL MOUNTED ELECTRONIC TIRE PRESSURE GAUGE

[76] Inventor: William L. Crutcher, 709 Gaylewood Dr., Richardson, Tex. 75080

[21] Appl. No.: 691,417

[22] Filed: Jan. 14, 1985

[51] Int. Cl.$^4$ .............................................. B60C 23/04
[52] U.S. Cl. .................................................. 73/146.8
[58] Field of Search ............................ 73/146.8, 146.4; 340/58

[56] References Cited

U.S. PATENT DOCUMENTS

| | | | |
|---|---|---|---|
| 1,136,901 | 4/1915 | Myers | 73/146.8 |
| 3,588,815 | 6/1971 | Koomce | 340/58 |
| 3,950,726 | 4/1976 | Fujikawa et al. | 340/58 |
| 4,059,823 | 11/1977 | Martin et al. | 340/58 |
| 4,137,520 | 1/1979 | Deveau | 340/58 |
| 4,286,253 | 8/1981 | Nagy | 340/58 |

FOREIGN PATENT DOCUMENTS 0199632  6/1923  United Kingdom ............... 73/146.8

Primary Examiner—Donald O. Woodiel
Attorney, Agent, or Firm—Warren H. Kintzinger

[57] ABSTRACT

A tire pressure indicating system using valve stem mounted strain gauge transducers circuit connected to a hub mounted display device. A manual switch connects wires of the system for battery power to the strain gauge transducers and for display actuation. Both tires of a dual tire unit are selectively switch actuated for display by a single display unit. The strain gauge transducers used are small and light and the circuit wires that may be quick disconnect connected to the transducer on a wheel tire valve stem and to the hub mounted display device are sufficiently small and light so as to not impose materially adverse unbalance problems on a rotating wheel while the using vehicle is moving down the road.

18 Claims, 6 Drawing Figures

WHEEL MOUNTED ELECTRONIC TIRE PRESSURE GAUGE

This invention relates in general to tire pressure gauges, and more particularly, to a wheel mounted electronic tire pressure gauge system using valve stem mounted strain gauge transducers circuit connected to a hub mounted display device for a wheel or dual wheel unit.

Proper inflation of tires is important and air pressure indication as to whether a tire is over inflated or whether the air pressure has dropped below safe operating levels is useful in knowing when to bleed air or increase tire pressure. Normal practice is to check tires infrequently by removing a valve cap and applying a pressure gauge to the valve stem. While a visual check of the tire and wheel may visually indicate under inflation this is not too reliable with present day low pressure and radial type tires. Improper tire inflation pressures is a major contributor to excessive tire wear and tire failure blowouts so great savings are realized, through increased tire life by maintaining proper tire pressures, along with enhanced safety. Proper tire inflation also enhances vehicle ride and handling characteristics so, if a vehicle is provided with an easy to use reliable tire pressure gauge system mounted on each wheel unit tire pressure will be checked more frequently and proper tire pressures will be more closely maintained.

It is therefore a principal object of this invention to provide a conveniently useable wheel mounted electronic tire pressure gauge system.

Another object is, through use of such a tire pressure gauge system, to increase tire wear life.

A further object is to improve vehicle ride and handling through proper tire inflation and to enhance vehicle safety with fewer tire blow out failures.

Still another object is to provide such an electronic tire pressure gauge system that draws low power for pressure display only when manually actuated for tire pressure indication at each respective wheel unit.

Features of the invention useful in accomplishing the above objects include, in a wheel mounted electronic tire pressure gauge system, valve stem mounted strain gauge transducers, one in each valve stem, connected to a wheel hub mounted display device that includes a small battery power supply. The strain gauge transducers used are small and light and light circuit wires are used with quick disconnect connectors and the hub mounted display device altogether are sufficiently small and light so as to not impose materially adverse unbalance problems on a rotating wheel while the using vehicle is moving down the road. Manual control switching is used to connect battery power to the strain gauge(s) of the wheel unit and to the display device mounted on the hub of that wheel unit. Wheel units are single wheel units and dual wheel units with, in the case of dual units, two strain gauges, one in the valve stem of each wheel tire controllably connected through manual switches to the hub mounted display device of that wheel unit.

Specific embodiments representing what are presently regarded as the best modes of carrying out the invention are illustrated in the accompanying drawings.

Figure 2:
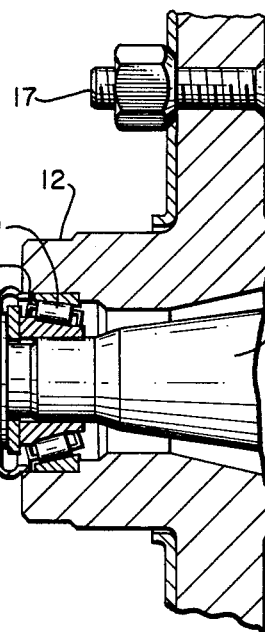
Figure 3:
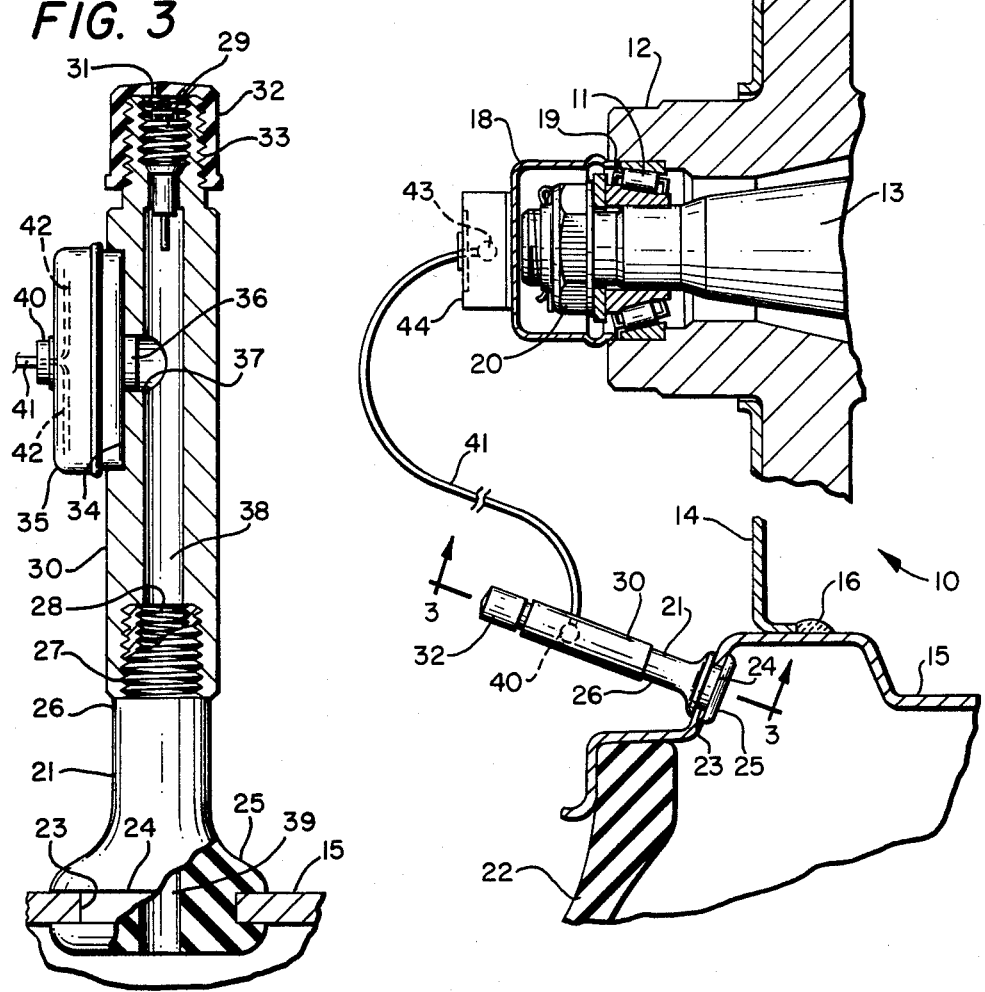
Figure 4:
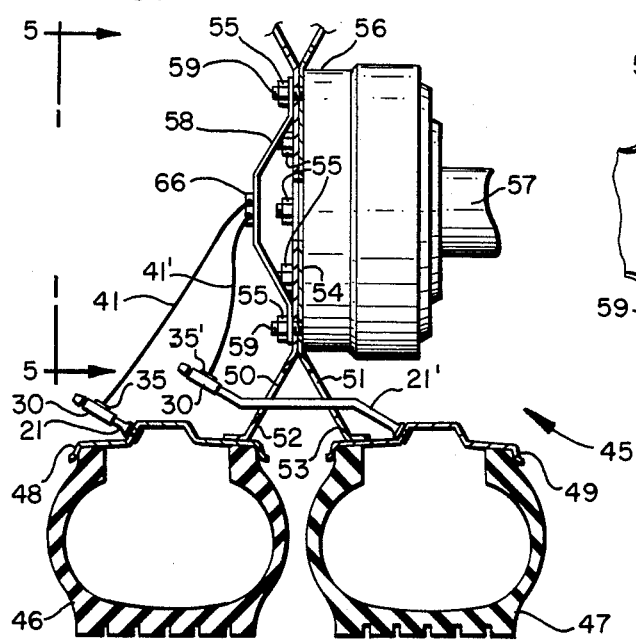
Figure 5:
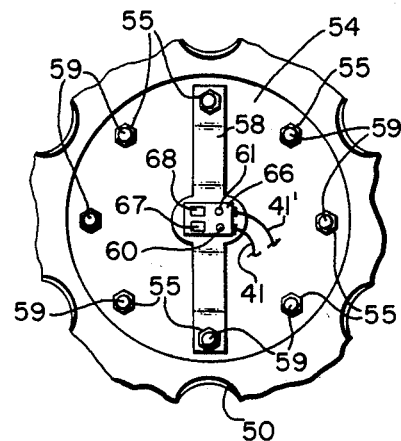
Figure 6:
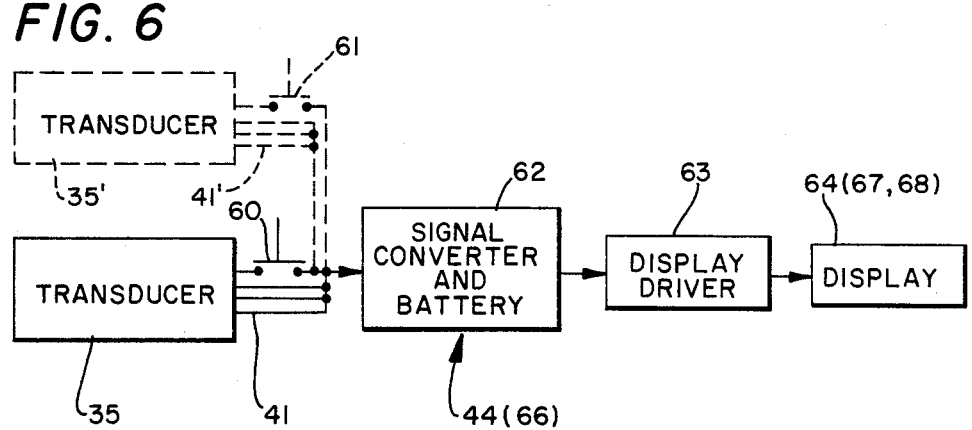

In the drawings:

FIG. 1 represents a side elevation of a vehicle wheel with a valve stem mounted strain gauge wire circuit connected to a wheel hub end mounted display device;

FIG. 2, a partial enlarged cut away and sectioned view taken along line 2—2 of FIG. 1 showing wheel, wheel mounting and tire pressure indicating system detail;

FIG. 3, an enlarged partially cut away and sectioned view taken along line 3—3 of FIG. 2 of a valve stem mounting;

FIG. 4, a partial cut away and sectioned view like FIG. 2 however of a dual wheel unit in place of a single wheel with both tires and wheels of the dual wheel unit included with the tire pressure indicating system;

FIG. 5, a partial end view of the wheel hub of the dual wheel unit of FIG. 4; and FIG. 6, a block schematic of a tire pressure indicating system.

Referring to the drawings:

The vehicle wheel 10 of FIGS. 1 and 2 is shown to be generally a wheel unit of standard construction mounted by roller bearings 11 for rotation of wheel hub 12 and wheel 10 about wheel spindle 13. The wheel disk 14 that mounts wheel rim 15 via a welded interconnection 16 is mounted on wheel hub 12 by a plurality of nut and stud assemblies 17 in a conventional manner. A grease cup 18 is inserted in and mounted in hub bearing opening 19 to enclose the bearing opening 19 and the threaded nut 20 end of wheel spindle 13.

Referring also to FIG. 3 valve stem 21, for tire 22 mounted on wheel rim 15, is mounted in opening 23 in wheel rim 15 in a conventional manner with the groove 24 of stem mounting base 25 fitting the rim of opening 23. The valve stem 21 has an extension 26 terminating in an externally threaded 27 and internally threaded 28 end into which valve insert 29 would be threaded if valve stem extension adapter 30 were not used with the valve insert 29 instead threaded into internal threads 31 of the adapter 30 and valve cap 32 threaded 33 on the outer end thereof. The stem extension adapter 30 is provided with a flat portion 34 for the mounting of a strain gauge pressure transducer 35 having a tubular extension 36 extended into opening 37 of valve stem extension adapter 30. This provides for free fluid air communication from the interior of the strain guage pressure transducer 35 through tubular extension 36, the center opening 38 of valve stem extension adapter 30, and the opening 39 through valve stem 21 to the interior of the tire 22 mounted on wheel rim 15.

The air strain gauge pressure transducer 35 is of a four wire or six wire type such as produced and made available in the market place by companies, for example, Celesco Transducer Products, Inc.; Entran Devices, Inc.; The Foxboro Co.; Kavlico Corp.; Motorola, Inc. Semiconductor prod and others. A quick disconnect connection 40 connects the wire package 41 of light fine wires to the wire connections 42 of the strain gauge pressure transducer 35. Quick disconnect connection 43 connects the other end of wire package 41 to the signal converter, battery, display driver and display unit 44 mounted on the outer end of grease cup 18.

With the dual wheel unit 45 of FIGS. 4 and 5 dual tires 46 and 47 are mounted on outer rim 48 and inner rim 49 respectively and a valve stem extension adapter 30 is mounted on a valve stem 21 on outer rim 48 just like with the single wheel of FIGS. 1, 2 and 3. With inner rim 49 an extra long valve stem 21' extends from inner rim 49 through openings 50 and 51 in wheel disk webs 52 and 53 that mount rims 48 and 49 from the wheel center 54 fastened by nuts 55 on wheel hub 56 at the end of axle 57. An additional valve stem extension adapter 30 is mounted on valve stem 21' in order that both valve stem extension adapters 30 are accessable from the outside of the dual wheel unit 45 and for connection of both valve stem extension adapters 30 via their respective strain gauge pressure transducers 35 and wire packages 41 respectively to the signal converter, battery, display driver and display unit 66. The unit 66 is is mounted on the middle of a bracket 58 that is mounted by nuts 55 on two opposite side studs of wheel studs 59 for ease of viewing and operation of manual switches 60 and 61 included therewith. In the single wheel embodiment of FIGS. 1 and 2 the manual switch 60 is used.

Referring also to FIG. 6 the strain gauge air pressure transducer 35 is connected through small multi-wire wire package 41 to signal converter and battery circuit section 62 that is operationally connected through display driver 63 to the display section 64 that may be a liquid crystal type display. Manual switch 60 is included to connect one of the lines of wire package 41 for power feed from the battery (which may be a small watch type battery) to and through the transducer 35 and thereby also power flow for the signal converter of section 62, the display driver 63 and the display 64. With the dual wheel embodiment of FIGS. 4 and 5 the additional transducer 35' therefore is connected through its multi-wire wire package 41' to the signal converter and battery circuit section 62 for pressure checking of the air pressure in tire 47 when manual switch 61 is depressed for pressure indication display. Such momentary drain of battery power insures long battery life even though it is a small low power battery. A single display could be used as shown with the single wheel embodiment of FIGS. 1 and 2 or a two display unit 66 with two liquid crystal displays 67 and 68 could be used for the dual wheel unit as indicated in FIG. 5.

Whereas this invention has been described with respect to several embodiments thereof, it should be realized that various changes may be made without departure from the essential contributions to the art made by the teachings hereof.

I claim:

1. An electronic wheel mounted tire pressure indicating system comprising: a wheel unit with a wheel tire; an electronic strain gauge transducer mounted on a wheel tire valve stem in fluid communication from the interior of said strain gauge transducer to the interior of said wheel tire; pressure display means mounted on the hub of the wheel mounting said wheel tire; battery power means mounted with said pressure display means connected through wire means for supplying power to said pressure display means and to said electronic strain gauge transducer; and manually actuated switch means for supplying power to said electronic strain gauge transducer and said pressure display means only when actuated for checking tire pressure via the tire pressure indicating system.

2. The electronic wheel mounted tire pressure indicating system of claim 1, wherein said wire means includes a multi-wire small light wire package interconnecting said strain gauge transducer and said pressure display means sufficiently small and light as to not materially adversely affect balance of the wheel while the wheel is rotating with movement of the vehicle the wheel is mounted on down the road.

3. The electronic wheel mounted tire pressure indicating system of claim 2, wherein a valve stem extension adapter mounting said electronic strain gauge transducer is mounted on said wheel tire valve stem.

4. The electronic wheel mounted tire pressure indicating system of claim 3, wherein said valve stem extension chapter is a tubular element with a valve insert positioned in its outer end instead of in said wheel tire valve stem.

5. The electronic wheel mounted tire pressure indicating system of claim 4, wherein said valve stem extension adapter is threaded onto said wheel tire valve stem; said valve insert is threaded into the outer end of said valve stem extension adapter; and a valve cap is threaded onto the outer end of said valve stem extension adapter.

6. The electronic wheel mounted tire pressure indicating system of claim 5, wherein said strain gauge transducer is positioned on said tubular element valve stem extension between said valve insert and the mounting of said tubular element on said wheel tire valve stem.

7. The electronic wheel mounted tire pressure indicating system of claim 4, wherein said strain gauge transducer is positioned on said tubular element valve stem extension between said valve insert and the mounting of said tubular element on said wheel tire valve stem.

8. The electronic wheel mounted tire pressure indicating system of claim 7, wherein said strain gauge transducer is mounted on a side of said tubular element and has a tubular stem extended into a side opening in said tubular element for fluid communication from the interior of said strain gauge transducer to the interior of said tubular element and thereby to the interior of said wheel tire.

9. The electronic wheel mounted tire pressure indicating system of claim 8, wherein at least one wire of said multi-wire small light wire package is connected through said manually actuated switch means to and through said battery power means for power flow to and through said electronic strain gauge transducer and to said pressure display means when said manually actuated switch means is manually held in the closed power transmitting state.

10. The electronic wheel mounted tire pressure indicating system of claim 9, wherein said manually actuated switch is of the normally biased open type switch for conservation of battery power when not manually held in the closed state.

11. The electronic wheel mounted tire pressure indicating system of claim 10, wherein said pressure display means includes a signal converter section connected to said transducer and connected to a low voltage low power display device.

12. The electronic wheel mounted tire pressure indicating system of claim 11, also including a display driver in the connection between said signal converter section and said display device.

13. The electronic wheel mounted tire pressure indicating system of claim 11, wherein said manually actuated switch means is mounted in a package including said signal converter section, said low voltage low power display device, and said battery means.

14. The electronic wheel mounted tire pressure indicating system of claim 13, wherein disconnected means is included with said multi-wire small light wire package interconnecting said strain gauge transducer and said pressure display means.

15. The electronic wheel mounted tire pressure indicating system of claim 11, wherein said pressure display means is mounted on the outer face of a grease cup mounted in the hub of the wheel the tire pressure indicating system is mounted on.

16. The electronic wheel mounted tire pressure indicating system of claim 11, wherein said pressure display means is mounted on a bracket held in place by two opposite side nut and studs of the wheel mounting hub.

17. The electronic wheel mounted tire pressure indicating system of claim 16, wherein the wheel unit mounting said pressure indicating system is a dual wheel with outer and inner wheel rim mounted tires with one of said electronic strain gauge transducers mounted on the wheel tire valve stem of both outer and inner wheel rim and tires; two of said multi-wire small light wire packages interconnecting the respective electronic strain gauge transducers with said pressure display means; and including two of said manually actuated switches for selectively activating the two strain gauge transducers and the pressure display means as desired.

18. The electronic wheel mounted tire pressure indicating system of claim 17, wherein said pressure display means includes two low voltage low power display devices one for each of the dual wheel tires.

* * * * *